May 18, 1948.  G. E. DATH  2,441,620
COMBINED SPRING AND FRICTION SHOCK ABSORBER
Filed Nov. 8, 1943
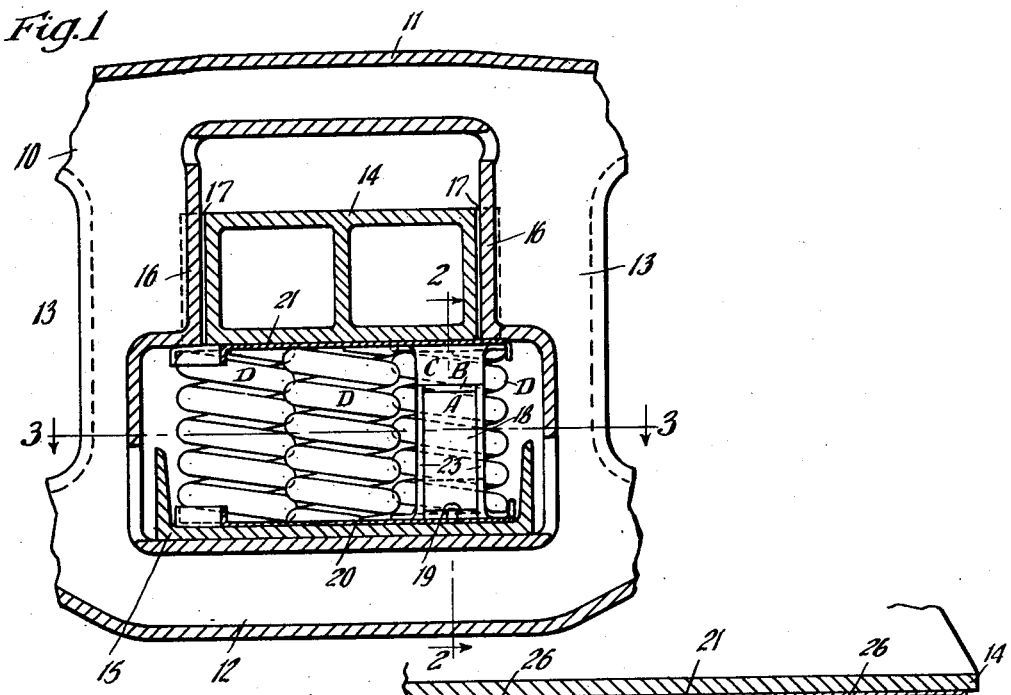
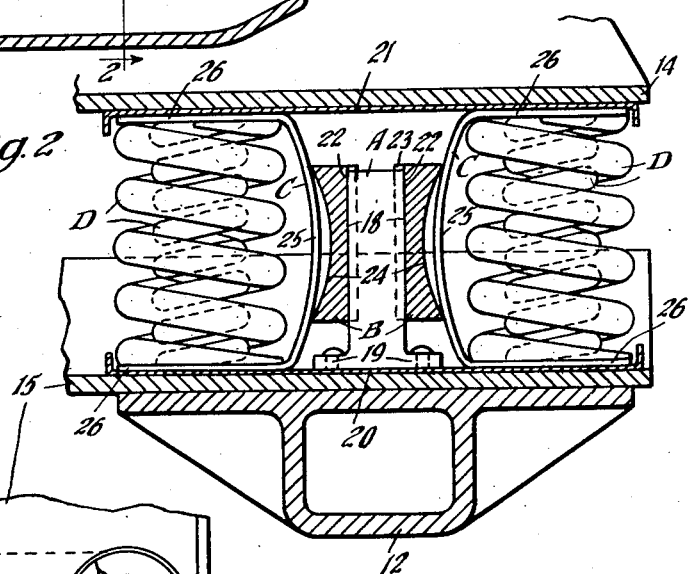
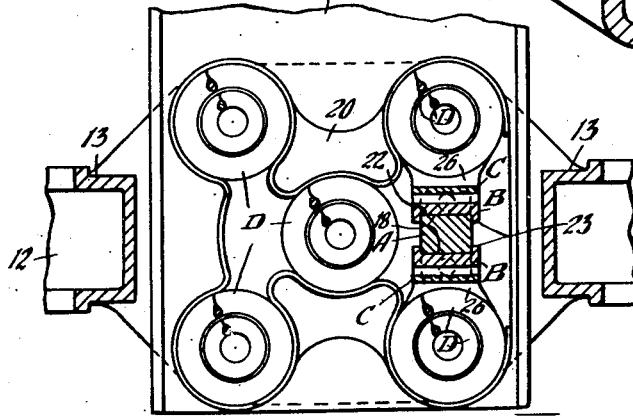
Inventor
George E. Dath
By Henry Fuchs
Atty.

Patented May 18, 1948

2,441,620

UNITED STATES PATENT OFFICE 2,441,620

COMBINED SPRING AND FRICTION SHOCK ABSORBER

George E. Dath, Chicago, Ill., assignor to W. H. Miner, Inc., Chicago, Ill., a corporation of Delaware Application November 8, 1943, Serial No. 509,347

9 Claims. (Cl. 267—9)

This invention relates to improvements in combined spring and friction shock absorbers, especially adapted for use in connection with railway car trucks.

One object of the invention is to provide a combined spring and friction shock absorber for railway car trucks including a cluster of springs together with a simple and efficient friction means for dampening or snubbing the action of the springs to minimize the vibrations imparted to the car body, thereby protecting the car and its lading against damage which would otherwise occur.

A more specific object of the invention is to provide in combination with the usual five spring cluster of a truck spring arrangement of railway cars, friction means for snubbing the action of the springs, comprising relatively slidable friction elements composed of a friction post and two friction shoes held in frictional contact with each other by spring plate members adapted to be flexed through relative approach of the spring followers of the truck spring cluster.

Other objects of the invention will more clearly appear from the description and claims hereinafter following.

In the drawing forming a part of this specification, Figure 1 is a vertical sectional view through the truck structure of a railway car, said view being taken lengthwise of the car through one of the truck side frame members. Figure 2 is a vertical sectional view, corresponding substantially to the line 2—2 of Figure 1. Figure 3 is a horizontal sectional view, corresponding substantially to the line 3—3 of Figure 1.

In said drawing, 10 indicates one of the side frame members of a railway car truck. The side frame 10, as shown, is in the form of a casting and has top and bottom members 11 and 12 connected by spaced vertical sections 13—13 forming guides for the truck bolster. As will be understood by those skilled in this art, the truck includes two side frame members 10—10, a truck bolster 14, a spring plank 15, and the usual truck springs. The opposite ends of the spring plank 15 are supported on the bottom members 12—12 of the truck side frames 10—10, and the opposite ends of the bolster 14 are guided between the sections 13—13 of the truck side frames. As shown most clearly in Figure 1, the sections 13—13 are inwardly offset near the upper ends to provide guides 16—16, which cooperate with guide seats 17—17 at the sides of the bolster 14. The springs at each side of the truck rest on the spring plank 15 and support the corresponding end of the bolster 14, thus yieldingly supporting the latter, which, in turn, supports the car body by means of the usual body bolster.

My improved combined spring and friction shock absorber is interposed between the truck bolster and spring plank of the car truck and forms a unit cooperating with the usual truck spring cluster.

My improved shock absorber, as shown in the drawing, is employed in connection with a cluster of five truck springs; however, the invention is not limited to such an arrangement and the improved shock absorber is equally adapted to be employed with a truck spring cluster comprising either a greater or lesser number of springs.

My improved shock absorber comprises broadly a friction post A; two friction shoes B—B; two plate spring members C—C; and two coil spring units D—D.

The friction post A is in the form of a solid bar of rectangular cross section having longitudinally extending, flat, friction surfaces 18—18 on opposite sides thereof. At the bottom end thereof the post A is provided with laterally projecting base flanges 19—19 by which the same is fixed to the bottom spring follower plate 20 of the truck spring cluster by rivets or other suitable securing means. As shown in Figure 2, the post projects upwardly from the spring plate 20 and has its upper end spaced from the top spring follower plate 21 of the spring cluster so as not to interfere with the required relative movement of the top and bottom spring plates toward each other in service.

The friction shoes B, which are two in number, are disposed at opposite sides of the post A and have longitudinally extending, flat, friction surfaces 22 on their inner sides engaged respectively with the friction surfaces 18—18 of the post. On the inner side, each shoe B has vertically extending, inwardly projecting, guide flanges 23 at opposite sides thereof, overhanging the post at opposite sides and guiding the shoes lengthwise of the post. On the outer side, each shoe is concave, that is, the vertical face thereof is concave lengthwise of the shoe to provide a concave seat 24.

The plate spring members C—C are disposed at opposite sides of the mechanism in engagement with the concave sides of the shoes B—B. Each plate spring member C comprises a vertically disposed, inwardly bowed, plate section 25 and top and bottom, horizontally disposed, plate-like flanges 26—26 extending outwardly from the top and bottom ends of the bowed section 25.

The plate spring members C—C are interposed between the top and bottom spring follower plates 21 and 20 of the truck spring cluster and have the top and bottom flanges 26 thereof bearing, respectively, on said spring follower plates, with the bowed sections 25 bearing on the outer sides of the shoes B—B. As shown in Figure 2, the curvature of the concavity 24 of each shoe is greater than that of the bowed section 25 of the plate spring member cooperating therewith to provide clearance for flexing of the bowed section 25 as the plate spring member is compressed between the top and bottom spring follower plates of the spring cluster.

The spring units D, which are two in number, are disposed at opposite sides of the mechanism and interposed between the top and bottom flanges 26—26 of the respective members C.

Each spring unit D comprises a light inner coil spring and a heavier outer coil spring, said unit corresponding to the units employed in the spring cluster. In fact, two of the standard units of the cluster of springs may be employed in place of the units D—D. The spring units D—D have their top and bottom ends bearing on the top and bottom flange sections 26—26 of the plate spring members C—C and yieldingly resist movement of the flange sections toward each other.

My improved combined spring and friction shock absorber is shown in the drawings as substituted for two of the outer coil spring units of a five unit truck spring cluster, but it is within the scope of the invention to substitute the same for two adjacent units of any other type of spring cluster comprising a greater or lesser number of spring units.

The operation of my improved shock absorber is as follows: Upon relative approach of the bolster and spring plank of the railway car truck, the mechanism is compressed between the spring follower plates 20 and 21 of the truck spring cluster, thereby flexing the bowed sections 25—25 of the plate spring members C—C against the shoes B—B and forcing the latter into intimate frictional contact with the post A. During this action the post A is moved lengthwise with respect to the shoes B—B due to relative approach of the follower plates 20 and 21. High frictional resistance is thus produced between the friction surfaces of the post and shoes to snub the action of the truck springs. At the same time the springs D—D are also compressed between the flange sections of the plate spring members C—C, thus adding their capacity to the remaining springs of the truck spring cluster. Upon recoil of the truck springs, as the bolster and spring plank move apart, and the spring follower plates 20 and 21 are returned to normal position by expansive action of the truck springs, the plate spring members C—C will return to the normal bowed condition shown in Figure 2, aided by the recoil of the springs D—D. At the same time the shoes B—B and post A will be separated lengthwise, the shoes being centered by engagement of the bowed sections 25 of the plate spring members C within the concavities of the outer sides of the shoes B.

I have herein shown and described what I now consider the preferred manner of carrying out my invention, but the same is merely illustrative and I contemplate all changes and modifications that come within the scope of the claims appended hereto.

I claim:

1. In a combined spring and friction shock absorber, the combination with top and bottom spring follower plates movable relatively toward and away from each other; of a friction post fixed to one of said follower plates and movable therewith; friction shoes at opposite sides of said post in sliding engagement therewith; and plate spring members, each interposed between and engaged by said spring follower plates, said members including vertical plate sections engaging said shoes and adapted to be flexed toward said shoes by compression between said follower plates upon relative approach of the latter to force the shoes against the post.

2. In a combined spring and friction shock absorber, the combination with top and bottom spring follower plates movable relatively toward and away from each other; of a friction post movable with one of said follower plates; friction shoes at opposite sides of said post in sliding engagement therewith; and spring plate members interposed between said spring follower plates, each of said members including a bowed vertical plate section and top and bottom, laterally outwardly projecting flanges integral with said plate sections and bearing on said top and bottom spring follower plates, said bowed vertical plate sections of said plate spring members bearing on the outer sides of said shoes for pressing said shoes against said post upon compression of said spring plate members between said follower plates.

3. In a combined spring and friction shock absorber, the combination with top and bottom spring follower plates movable relatively toward and away from each other; of a friction post movable with one of said follower plates; friction shoes at opposite sides of said post in sliding engagement therewith; spring plate members interposed between said spring follower plates, each of said members comprising a vertically extending, inwardly bowed plate section and top and bottom, laterally outwardly projecting flanges integral with said bowed section bearing on said top and bottom spring follower plates, said bowed vertical plate sections bearing on the outer sides of said shoes for pressing said shoes against said post upon compression of said spring plate members between said follower plates; and spring means interposed between said top and bottom flanges of said plate spring members.

4. In a combined spring and friction shock absorber, the combination with top and bottom spring follower plates movable relatively toward and away from each other; of a friction post movable with one of said follower plates; spring plate members at opposite sides of the mechanism interposed between said follower plates, each spring plate member including a longitudinally, inwardly bowed, vertical, plate section, and top and bottom, horizontal flanges extending outwardly from the top and bottom ends of said bowed section, said top and bottom flanges bearing on the top and bottom spring follower plates, respectively; spring resistance means interposed between the top and bottom flanges of each spring plate member; and friction shoes interposed between said post and the bowed sections of said members.

5. In a combined spring and friction shock absorber, the combination with top and bottom spring follower plates movable relatively toward and away from each other; of a friction post movable with one of said follower plates; spring plate members at opposite sides of the mechanism interposed between said follower plates, each spring plate member including a longitudinally, inwardly bowed, vertical, plate section, and top and bottom, horizontal flanges extending outwardly from the top and bottom ends of said bowed section, said top and bottom flanges bearing on the top and bottom spring follower plates, respectively; spring resistance means interposed between the top and bottom flanges of each spring plate member; and friction shoes interposed between said post and bowed sections of said members, said shoes having concave outer sides within which the bowed sections of said members are engaged.

6. In a combined spring and friction shock absorbing mechanism, the combination with a central friction post; of friction shoes embracing said post on opposite sides, said shoes having concave outer sides, said post and shoes being slidable lengthwise with respect to each other; and lengthwise compressible means disposed at opposite sides of the mechanism for forcing said shoes against the post, each of said means including a vertically disposed, inwardly bowed, plate section engaged with the concavity of the outer side of the corresponding shoe, and top and bottom, horizontally disposed, laterally outwardly projecting flanges at the top and bottom ends of said bowed plate for receiving the compression actuating force lengthwise of said means.

7. In a combined spring and friction shock absorbing mechanism, the combination with a central friction post; of friction shoes embracing said post on opposite sides, said post and shoes being slidable lengthwise with respect to each other; means for pressing said shoes against the post including members at opposite sides of the mechanism, each member including a vertically disposed, inwardly bowed, plate section and horizontally disposed, top and bottom flanges extending outwardly from said plate section, said bowed plate sections bearing on the outer sides of the shoes; and coil springs interposed between the top and bottom flanges of each bowed plate section.

8. In a combined spring and friction shock absorbing mechanism, the combination with a central friction post; of friction shoes embracing said post on opposite sides, said shoes having concave outer sides, said post and shoes being slidable lengthwise with respect to each other; means disposed at opposite sides of the mechanism for forcing said shoes against the post, each of said means including a vertically disposed, inwardly bowed, plate section engaged within the concavity of the outer side of the corresponding shoes, and top and bottom, horizontally disposed, laterally outwardly projecting flanges at the top and bottom ends of said bowed plate adapted to receive the actuating force; and coil springs interposed between the top and bottom flanges of each bowed plate section.

9. In a combined spring and friction shock absorbing mechanism, the combination with a central, vertically disposed friction post having vertically extending, exterior friction surfaces on opposite sides thereof; of friction shoes embracing said post on opposite sides and in engagement with the friction surfaces thereof, said post and shoes being slidable lengthwise with respect to each other; and means for pressing said shoes against the post and sliding said post and shoes with respect to each other, including top and bottom follower elements movable toward each other, and spring members, said post being movable in unison with one of said follower elements, said spring members being disposed at opposite sides of the mechanism, each spring member including a vertically disposed, inwardly bowed, resilient plate section and horizontally disposed, top and bottom flanges extending laterally outwardly from said plate section and integral therewith, said flanges bearing respectively on said follower elements, said bowed plate sections of said spring member bearing on the outer sides of said shoes.

GEORGE E. DATH.

REFERENCES CITED

The following references are of record in the file of this patent:

UNITED STATES PATENTS

| Number | Name | Date |
|---|---|---|
| 746,043 | Dengere | Dec. 8, 1903 |
| 1,243,007 | Taylor | Oct. 16, 1917 |
| 1,486,941 | Woernley | Mar. 18, 1924 |
| 1,808,839 | Davis | June 9, 1931 |
| 1,856,422 | O'Connor | May 3, 1932 |
| 1,938,715 | Miner | Dec. 12, 1933 |
| 2,084,638 | Goodwin | June 22, 1937 |
| 2,219,001 | Woodman | Oct. 22, 1940 |
| 2,295,556 | Flesch | Sept. 15, 1942 |